UNITED STATES PATENT OFFICE 2,340,609

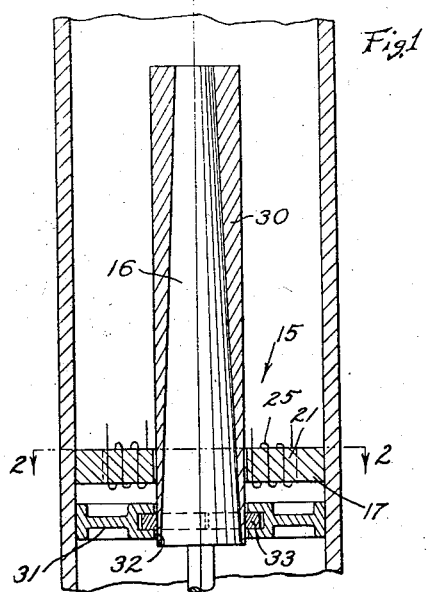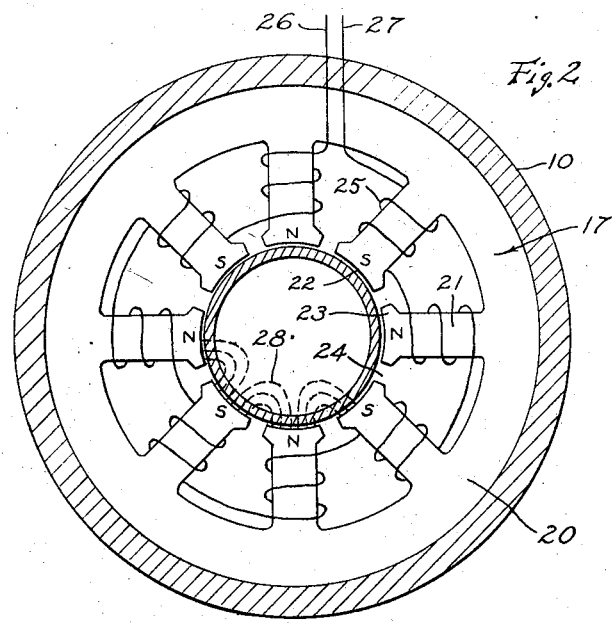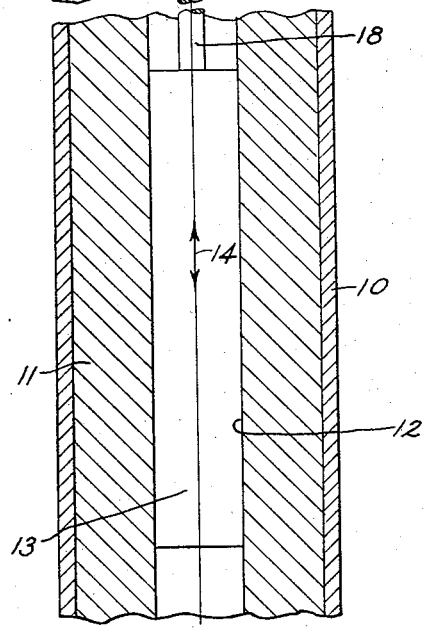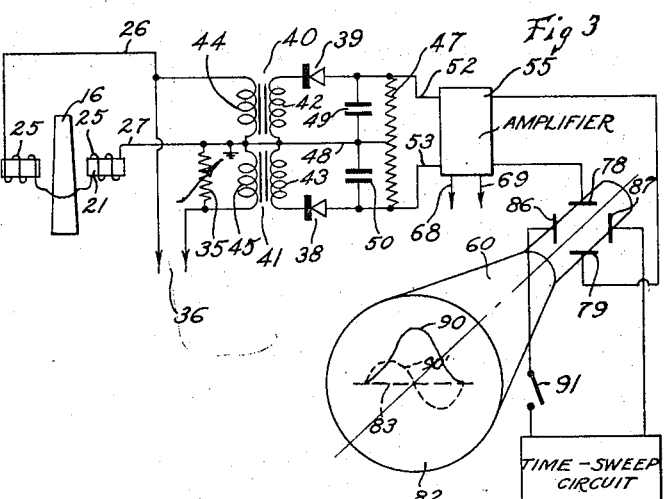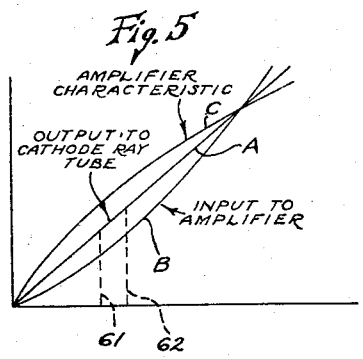

APPARATUS FOR DETERMINING DISPLACEMENTS

Ricardo Mestas, Los Angeles, Calif., assignor to Kobe, Inc., Huntington Park, Calif., a corporation of California Application August 3, 1940, Serial No. 350,940

8 Claims. (Cl. 177—351)

My invention relates to a method and apparatus for determining displacements and, more particularly, to a method and apparatus for determining or indicating at a remote point the motion or displacement of an element at an inaccessible point.

Devices are known which are capable of indicating at a remote point small movements of an element but no satisfactory device has been developed capable of determining or indicating accurately a relatively slow motion of an element through a relatively long locus of motion. For example, it is often desirable to be able to ascertain amplitude of displacement, rate of motion, or acceleration of a pump plunger which may be located several thousand feet below the surface of the ground. The pump may be of the fluid-actuated type or the plunger may be actuated by a long string of sucker rods which may be elastic to such an extent that movement of the upper end of the string is not reflected in corresponding movements of the pump plunger. The present invention is applicable to such situations and, in fact, to any situation where it is desirable to know the characteristics of movement of an element, usually reciprocating, positioned at an inaccessible point, and it is an important object of the present invention to provide a novel method and apparatus usable in this connection.

Another object of the invention is to provide such an apparatus which has very little inertia so that transient motion within the main stroke can be accurately determined, for example vibration or rapid oscillations impressed on the main motion.

Another object of the invention is to detect and, if desired, to indicate motion or displacement of such an element by electric means.

The invention also includes among its objects the provision of a tapered member of magnetic material moving with the element and so disposed with reference to a magnetic circuit as to product electric variations capable of indicating displacement, speed, acceleration, etc., of this element.

Another object of the invention is to provide a novel circuit connectible to a control unit which changes its electric characteristics in response to movement of the element.

Still another object of the invention is to provide a novel method and apparatus for plotting a curve indicating the characteristics of motion of the element, and, in the preferred embodiment, to use a cathode ray tube in this connection.

Another object of the invention is to indicate the motion of a remote element with reference to time or with reference to some other base. For example, it is possible to produce a curve of piston displacement with respect to displacement of some other element such as a valve mechanism, or with respect to some other variable such as pressure variations produced by or actuating the piston.

Still another object of the invention is to obtain indications which are substantially proportional to the movement of the element and, if necessary, to provide means compensating for any non-proportionality introduced in the system by the circuit or the control unit connected thereto.

Further objects and advantages of the invention will be made evident hereinafter.

For purpose of clarity, the invention will be illustrated very diagrammatically, the showings being greatly exaggerated as to relative size and shape of the parts with this in mind. Likewise, the invention will be illustrated with particular reference to one problem and its adaptation to other situations will be readily apparent. By this exemplary showing, it is not intended that the invention shall be limited thereto.

Referring to the drawing:

Figure 1 is a diagrammatic view in vertical section of a control unit associated with a piston-cylinder arrangement;

Figure 2 is a horizontal sectional view taken substantially as indicated by the line 2—2 of Figure 1, which, in turn, is taken substantially as indicated by the arrows 1—1 of Figure 2;

Figures 3 and 4 are circuit diagrams showing details of typical circuits with which the invention is concerned; and Figure 5 is a graphical representation of the manner of compensating for non-linearity or non-proportionality in the system.

Referring particularly to Figure 1, I show a tube 10 in which is positioned a liner 11 providing a cylinder 12 in which is disposed a piston 13. Such a structure may be considered typical of a deep-well pump for example, in which the piston 13 is reciprocated through a relatively extensive locus of motion in a direction indicated by the double-headed arrow 14. By way of example, this piston may be used on its upward stroke to draw well fluid into the lower end of the cylinder 12, and on its downward stroke to force this liquid upward in the well, through means not shown, to the surface of the ground. The piston 13 may be reciprocated hydraulically, using a suitable valve mechanism known in the art, or by use of a string of sucker rods suitably connected thereto.

In the upper portion of the tube 10 is shown a control unit 15. This includes generally a tapered rod 16 formed of iron or other magnetic material, the taper of which is greatly exaggerated in Figure 1. This rod reciprocates with reference to a stator 17 and cooperates therewith in defining a magnetic circuit, the reluctance of which changes as the tapered rod 16 moves. The tapered rod 16 is interconnected and moves proportionally with the piston 13 by any suitable means, such as by connection through a rod 18.

The details of the stator 17 will be clear from Figure 2. Preferably, this stator comprises a multi-pole laminated core 20 built up from punchings or made of suitable solid material or of powdered magnetic material held together by a binder of non-magnetic dielectric material. The core 20 comprises essentially a peripheral ring with a plurality of poles 21 extending inward to define a circular space 22 in which the tapered rod 16 reciprocates. It is usually preferable, though not essential, to provide pole pieces or shoes 23 on the inner ends of the poles 21 to surround the circular space 22 except for gaps 24 separating these shoes.

In the preferred embodiment, a winding 25 is disposed around each of the poles, these windings being connected together in series and being wound in such manner that alternate poles are of the same polarity so that adjacent poles are of opposite polarity, as indicated in Figure 2. The series-connected windings 25 are adapted to be energized directly or inductively by a source of alternating potential in a manner to be hereinafter described, and conductors 26 and 27 are shown in Figure 2 in this capacity. It will be understood that the polarity indicated in Figure 2 changes with each half cycle. The flux densities in the magnetic circuit should be kept low so as not to reach the point of saturation, as this would introduce errors in the system.

The flux paths between adjacent poles are such that a substantial portion of the flux moves inward and through a peripheral portion of the tapered rod 16, as indicated generally by the lines of force 28 in Figure 2. To accomplish this, the gap between the tapered rod 16 and the poles is preferably smaller than the gap 24 between adjacent poles, this being readily accomplished with the type of low-taper rod 16 to be hereinafter described, but being difficult to show in Figure 2 in view of the exaggerated distance shown between the tapered rod 16 and the poles 21. On the other hand, it is desirable that the circular space 22 should be substantially enclosed by the pole pieces or shoes 23 so that minor changes in lateral position of the tapered rod 16 with respect to this circular opening will not destroy the accuracy of the indication.

Referring now to the tapered rod 16, this is preferably surrounded by a sheath 30, preferably formed of non-magnetic material or being only slightly magnetic as compared with the magnetic material of the tapered rod 16. The periphery of the sheath 30 is preferably cylindrical, thus making it possible to guide the longitudinal movement without resort to resiliently-mounted guide means. In Figure 1, the guide means is shown diagrammatically as including a web 31 suitably retained in the tube 10 and providing a central opening 32 which is only a few thousandths of an inch larger in diameter than the sheath 30. Mounted within an annular channel of the web 31 is a ring 33 which may be split, if desired, and which slides along the sheath 30 during the reciprocating motion thereof to prevent scoring thereof and aid in the lubrication of the journaling action of the opening 32 when a suitable lubricant is applied to the ring 33. The guide means shown not only centers the tapered rod 16 but keeps it from whipping or vibrating.

The sheath 30 is preferably applied to the tapered rod 16 by electroplating. Thus, the tapered rod can be first accurately ground to size and a relatively thick coating of chromium plated to the surface thereof, the exterior of the chromium plate being then tapered correspondingly with the tapered rod 16. Thereafter, the periphery of the chromium coating is ground to cylindrical shape to produce the sheath 30. The chromium is relatively non-magnetic and does not interfere substantially with the flux moving from one pole to the other through the tapered rod 16. It will be clear that the taper shown in Figure 1 is greatly exaggerated so that the chromium plated thereto need not be nearly as thick as suggested in this diagrammatic view. In practice, I find it sufficient to use a taper on the rod 16 which is very small, a taper of .001" per inch of length being sufficient when measuring a motion of 18" and when the diameter of the tapered rod is about 5/8", it being understood that other tapers can be used to meet other conditions.

Figure 3 shows one manner of using the control unit 15 of Figure 1. As there shown, the series-connected windings 25 are connected in series with a variable impedance 35 which may be, and preferably is, remote from the control unit 15. This variable impedance serves the purposes to be later described and may be a variable resistance, though it is preferable to use a variable reactance having an impedance of the same order as the series-connected windings 25 so that the current and voltage in the two portions of the output circuit (to which the impedance 35 and windings 25 are respectively connected, as will be described) will have substantially the same phase relationship.

The source of alternating potential is indicated by the numeral 36 and the windings 25 are shown as being connected thereacross in series with the variable impedance 35 so that the voltage of the source is divided therebetween as determined by the relative impedances. It will be clear, however, that inductive energization of the windings 25 and impedance 35 can be used by providing one or more primary windings inductively coupled thereto, in which event a primary winding can be wound on the poles 21 and connected to the source 36. The frequency of the energizing alternating-current circuit should be chosen as to be widely divergent from the frequency of reciprocation of the tapered rod 16. For example, even with the relatively slow reciprocation as induced by the piston 13 of a deep-well pump, it is desirable to use a higher-than-commercial frequency in order that the ultimate indication will be steady and not affected by the frequency of the line 36. Very satisfactory results can be obtained by using a frequency of 500–2000 cycles per second or higher, depending upon the rate of reciprocation of the piston 13 and the transient movements impressed thereon during the main reciprocative movement.

A rectifier means is preferably used, two rectifiers 37 and 38 being shown associated with the respective halves of the circuit including the windings 25 and the variable impedance 35. These rectifiers may be of any suitable type, for example, copper oxide rectifiers can be used or rectification can be obtained by use of vacuum tubes. The rectifiers can be directly connected across the respective halves of the circuit, in which event it is best to have the impedances of each half match that of its corresponding rectifier. However, I prefer to interpose transformers 40 and 41 therebetween, the secondary windings 42 and 43 of which match in impedance the rectifiers 37 and 38. The transformer 40 is shown as including a primary winding 44 connected across that half of the circuit including the windings 25, while the transformer 41 is shown as including a primary winding 45 connected across the other half of the circuit and in parallel with the variable impedance 35. The common terminal of the primary windings 44 and 45 can then advantageously be grounded to increase the stability of the system. If these transformers are equipped with cores of magnetic material, as is usually desirable, these cores should be separate rather than being common to the two transformers.

The output from the rectifying means is shown as being delivered to a resistor 47, the center tap of which is connected by a conductor 48 to the common terminal of the secondary windings 42 and 43. By-pass or filter condensers 49 and 50 may be connected across the halves of the resistor 47 to filter out the peaks and valleys of the rectified current. The output of the rectifying means is fed from the ends of this resistor through conductors 52 and 53 to an amplifier 55.

It is preferred in this connection to use an ortho amplifier to compensate for any non-linearity or non-proportionality of voltage with respect to movement of the tapered rod 16 produced in the previous portion of the equipment. It is desirable to deliver to the ultimate indicating means a potential which varies substantially linearly or proportionally with the movement of the tapered rod 16. There may be minor deviations from such proportionality resulting from the design of the control unit so that the input to the amplifier may not vary strictly proportionally with movement of the tapered rod 16. In some instances, these non-linear variations can be tolerated or compensated for in the ultimate indicating means or in the degree of taper of the rod 16 but, in those installations requiring a high degree of accuracy, it is very desirable to transmit to the indicating means a potential which varies linearly or proportionally with the movement of the tapered rod 16.

Correction for the non-proportional nature of the input to the amplifier 55 can be accomplished in various ways as suggested, but I find it particularly advantageous to use an ortho amplifier having a characteristic curve which effects this compensation. This can be best understood with reference to Figure 5 in which the line A represents a linear or proportional variation. The curve B represents the input to the amplifier and shows, considerably exaggerated, the deviation from a linear or proportional relation. By proper selection and control of an amplifier, a characteristic curve indicated at C can be obtained therefrom which compensates for the non-linear nature of curve B to produce a substantially linear or proportional relationship, indicated by the line A, and which can thus be delivered to the indicating means, for example a cathode ray tube 60. It will be understood that while it may not be feasible to compensate accurately over the entire range in which the curves C and B are separated, it is possible to do this over a more limited range, for example between dotted lines 61 and 62 of Figure 5, and the system can be made to operate within this limited range as will be hereinafter described.

While multi-stage amplifiers 55 can be used, Figure 4 exemplifies one type of amplifier which can be used in the circuit of Figure 3 to secure the correction or compensation referred to. Here, a pentode tube 64 is employed, for example a tube of the R. C. A. 58 type, a grid 65 of which is connected to the conductor 52. The other side of the input to the tube 64 is represented by a cathode 66 which may be of the indirectly-heated type, as shown.

A source of direct-current potential is indicated as applied between conductors 68 and 69. The voltage should be sufficient to operate the tube 64 and to supply the requisite deflecting potentials to the cathode ray tube 60. A resistor 70 is shown connected between the conductors 68 and 69. The conductor 53 may extend to a movable contact 71 engaging the resistor 70. The cathode 66 is tapped into this resistor at a point of appropriate potential as is also a grid means 72 which may well comprise the conventional screen grid. A plate 73 of the tube is connected by a conductor 74 extending to one terminal of a resistor 75, the other terminal of which is connected to the conductor 69.

A suitable potential-responsive indicating means is connected to the output of the amplifier and serves to produce a visual manifestation of the character of movement of the piston 13. This indicating means may comprise a galvanometer or other meter producing deflections substantially proportional to changes in potential input and being capable of indicating same, as by drawing a curve on a tape moving in response to time or some other variable such as valve motion of a pump, pressure variations, etc. A cathode tube 60 can well be used in this connection and is shown in Figures 3 and 4 as including conventional vertical-deflecting plates 78 and 79. Figure 3 shows these as being connected to a vertical-sweep circuit comprising the output of the amplifier 55, and Figure 4 shows these as being connected between the conductor 74 and a variable contact 80 adjustable with reference to the resistor 70. As is well known, the plates 78 and 79 serve to impart a vertical motion to the stream of electrons moving through the tube 60 and impinging on a screen 82 thereof, the stream of electrons being thereby made visible. Correspondingly, the spot formed by the stream of electrons will move vertically with respect to a base line, indicated by the dotted line 83, by an amount proportional to the potential impressed on the plates 78 and 79 by the amplifier 55. Correspondingly, as the tapered rod 16 moves up and down, this spot will move up and down on the screen 82 synchronously and proportionally with the piston 13 if the system is properly adjusted.

It is often desirable to produce a curve indicating piston displacement with respect to some other variable such as time, valve motion, pressure variations, etc. To do this, it is only necessary to connect a horizontal sweep circuit to the cathode ray tube 60 and change the potential therein in response to changes in this other variable. For example, if a curve of piston displacements with respect to time is desired, the horizontal sweep circuit may comprise a time sweep circuit, applying a potential which changes proportionally with respect to time, and starting the time sweep at a desired point in the movement of the piston. This is exemplified in Figures 3 and 4 by a time sweep circuit 85 connected across horizontal-deflecting plates 86 and 87 of the cathode ray tube to impart a horizontal displacement to the electron stream. Such time-sweep circuits are known in the art and are of such nature as to move the spot horizontally across the tube parallel to the base line 83 at a constant rate. By energizing the horizontal-deflecting plates at the beginning of the movement of the piston 13, the stream of electrons will be deflected to trace a curve on the screen 82, such as indicated by the numeral 90, and a photograph can be made of this curve or of the path of the spot formed by the stream of electrons to obtain a permanent record. Similarly, by energizing the horizontal-deflecting plates when the piston 13 is in a mean position and when the spot is on the base line 83, a curve in the nature of a sine curve can be obtained, as suggested by the dotted curve 90', where displacements from the mean position are indicated on opposite sides of the base line 83. This is usually the preferred mode of operation.

Various means can be used for starting the time-sweep circuit at the instant that the piston 13 starts its movement in a selected position in its path of travel, a very advantageous automatic system being shown in my co-pending application Serial No. 377,168. As shown in Figure 3, a switch 91 may serve in this capacity, being manually or otherwise closed at the proper time, for example when the spot is on the base line 83. Manual operation of the switch 91 is entirely practicable when slow reciprocating motions are being indicated but with faster movements, it is desirable to provide a synchronously-operating means for closing the switch 91, such as described in my application supra.

The preferred method of operating the system when piston displacements are being measured will be described as representing a typical use. With no input from the control unit, the spot is adjusted to coincide with a selected base line 83 by movement of the adjustable contact 80 with respect to the resistor 70. The input from the control unit is then connected. The contact 71 is then adjusted until the spot moves proportionally with the piston when the piston is moved throughout its range. This proportionality is checked by displacing the piston different amounts and measuring the displacement of the spot from the base line 83. The piston is then disposed in its central or mean position, while the pump is still accessible at the top of the well so that piston position can be accurately measured. The variable impedance 35 is then adjusted to bring the spot to coincide with the base line 83 if it is not already there, and subsequent minor variations in potential of the source 36 will not shift the spot from this base line, an important characteristic of the circuit shown. The pump can now be lowered into the well, conductors 26 and 27 extending upward in the well to the circuit at the top. Reciprocation of the piston 13 will then cause proportional displacements of the spot, displacements above the mean position being indicated by displacements of the spot above the base line 83 while displacements below the mean position will be indicated by displacements of the spot below this base line. By energizing the time-sweep circuit 85 when the spot is on the base line, a curve such as indicated at 90' will be swept out and can be photographed to obtain a permanent record.

If it is desired to increase the amplitude of vertical sweep of the spot, this can be accomplished by increasing the A. C. potential derived from the source 36. If it is desired to make the curve 90' asymmetrical with respect to the base line 83, this can be accomplished by adjusting the variable impedance 35. This may be desirable when it is desired to view a particular part of the curve 90', for example a crest thereof, and very accurate representations can be obtained of this selected part of the curve by further increasing the potential derived from the source 36 to increase the vertical displacement of the spot.

Various changes can be made without departing from the spirit of the invention as defined in the appended claims.

I claim as my invention:

1. In combination in a device responsive to motion of a reciprocable element: a tapered rod formed of magnetic material and operatively connected to said element to move proportionally therewith in a longitudinal direction; means for establishing a magnetic circuit traversing at least a part of said tapered rod, said means including a stationary core spaced from said tapered rod to form a gap which varies in width with longitudinal movement of said rod; a winding associated with said magnetic circuit to be responsive to changes in reluctance of said magnetic circuit as said tapered rod moves relative to said core.

2. In a device of the character described, the combination of: a first element comprising a tapered rod formed of magnetic material; a second element comprising a multi-pole core providing a space for receiving said tapered rod and cooperating therewith in defining a magnetic circuit including a plurality of gaps between said poles and that portion of said tapered rod which is within said space; means for mounting one of said elements to move with respect to the other of said elements to bring successive sections of said tapered rod within said space and produce variations in the reluctance of said magnetic circuit; and means associated with said magnetic circuit and responsive to changes in reluctance thereof.

3. A combination as defined in claim 2, in which said core provides a sufficient number of poles to substantially completely surround the space occupied by said tapered rod, and in which said means responsive to changes in reluctance comprises series-connected windings around said poles.

4. A combination as defined in claim 2, including a sheath of relatively non-magnetic material surrounding said tapered rod, and guide means engaging said sheath for guiding said tapered rod with respect to said core.

5. A combination as defined in claim 2, including a sheath of relatively non-magnetic material surrounding said tapered rod and providing an external cylindrical surface, and including a guide means associated with said external cylindrical surface for guiding the motion of said tapered rod with respect to said core.

6. In a device of the character described, the combination of: a first element comprising a tapered rod formed of magnetic material; a sheath of relatively non-magnetic material surrounding said tapered rod and providing an external cylindrical surface; a second element including a core providing a face adjacent said cylindrical surface of said sheath whereby relative movement of said first and second elements in a direction parallel to the axis of said tapered rod will change the distance across the gap between said face and said tapered rod; and means for sending magnetic flux between said core and said tapered rod through said sheath.

7. In a device for indicating a relatively slow and extensive motion of a reciprocable element, the combination of: means for defining a magnetic circuit, said means including telescoping relatively movable magnetic members forming a variable-reluctance gap in said magnetic circuit; means operatively connecting said reciprocable element to one of said magnetic members to move same relative to the other magnetic member to vary the reluctance of said gap in said magnetic circuit; means for producing a direct current output potential which varies with changes in reluctance of said magnetic circuit, said means including a rectifier means, a winding linked with said magnetic circuit, and a circuit means energized by alternating current for connecting said winding and said rectifier means, said members and said gap being formed in such manner that said output potential varies somewhat non-proportionally with respect to the motion of said reciprocable element; and an ortho amplifier providing an input circuit connected to receive said output potential and having a non-linear characteristic as between input and output to compensate for such non-proportionality and produce an amplified output potential which varies substantially proportionally with respect to the motion of said reciprocable element.

8. In combination in a device responsive to motion of a reciprocable element: a first member comprising a tapered rod formed of magnetic material; a second member comprising a core providing a space for receiving said tapered rod and cooperating therewith in defining a magnetic circuit including a variable-reluctance gap between said core and said tapered rod; means for mounting one of said members to move with respect to the other of said members in response to motion of said reciprocable element to bring successive portions of said tapered rod within said space and produce variations in the reluctance of said magnetic circuit; a winding linked with said magnetic circuit; an energized circuit means connected to said winding and providing an output means, said members and said gap being formed in such manner that the potential across said output means varies somewhat non-proportionally with respect to motion of said reciprocable element; and an ortho amplifier providing an input circuit receiving the potential variations of said output means and having a characteristic input-output curve deviating from linearity sufficient to correct for said somewhat non-proportional variation to produce an amplified output potential which varies substantially proportionally with movement of said reciprocable element.

RICARDO MESTAS.